US010185924B1

(12) United States Patent
McClintock et al.

(10) Patent No.: US 10,185,924 B1
(45) Date of Patent: Jan. 22, 2019

(54) SECURITY RISK RESPONSE IMPACT ANALYSIS

(71) Applicant: AMAZON TECHNOLOGIES, INC., Reno, NV (US)

(72) Inventors: Jon Arron McClintock, Seattle, WA (US); George Nikolaos Stathakopoulos, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 860 days.

(21) Appl. No.: 14/321,163

(22) Filed: Jul. 1, 2014

(51) Int. Cl.
*H04L 29/06* (2006.01)
*G06Q 10/06* (2012.01)
*G06F 21/57* (2013.01)

(52) U.S. Cl.
CPC ....... *G06Q 10/0635* (2013.01); *G06F 21/577* (2013.01); *H04L 29/06904* (2013.01)

(58) Field of Classification Search
CPC .............. G06Q 10/0635; G06F 21/577; H04L 29/06904
See application file for complete search history.

(56) References Cited

U.S. PATENT DOCUMENTS

| | | | | |
|---|---|---|---|---|
| 7,028,338 | B1* | 4/2006 | Norris ..................... | G06F 21/55 713/188 |
| 7,031,838 | B1* | 4/2006 | Young .................... | G06Q 10/06 702/2 |
| 7,805,329 | B2* | 9/2010 | Maeckel ................ | G06Q 10/06 705/7.28 |
| 8,195,502 | B2* | 6/2012 | Hilkemeyer ....... | G06Q 30/0206 705/400 |
| 8,214,906 | B2* | 7/2012 | Goddard ............... | G06F 11/008 726/22 |
| 8,925,092 | B1* | 12/2014 | Johansson ........... | H04L 63/1433 726/25 |
| 9,166,999 | B1* | 10/2015 | Kulkarni ............. | H04L 63/1433 |
| 9,246,923 | B1* | 1/2016 | Terribilini ............. | H04L 63/101 |
| 9,330,262 | B2* | 5/2016 | Salehie .................. | G06F 21/50 |
| 9,336,385 | B1* | 5/2016 | Spencer .............. | H04L 63/1441 |
| 9,363,279 | B2* | 6/2016 | Evrard ................ | H04L 63/1416 |
| 9,953,321 | B2* | 4/2018 | Zoldi ................ | G06Q 20/4016 |
| 2001/0044739 | A1* | 11/2001 | Bensemana ............ | G06Q 30/02 705/7.32 |
| 2005/0086530 | A1* | 4/2005 | Goddard ............... | G06F 11/008 726/4 |

(Continued)

OTHER PUBLICATIONS

Zbigniew Ciechanowicz, Risk analysis: requirements, conflicts and problems, Computers & Security, vol. 16, Issue 3, 1997, pp. 223-232, ISSN 0167-4048.*

(Continued)

*Primary Examiner* — David Garcia Cervetti
(74) *Attorney, Agent, or Firm* — Lindauer Law, PLLC

(57) ABSTRACT

Techniques are described for generating response recommendation information that describes one or more response profiles, each including one or more actions that may be performed to respond to a security risk present in a deployed software module. The response recommendation information may quantify, for each response profile, a cost and a benefit due to the performance of the action(s) included in the response profile. The cost may include lost revenues or other value lost due to the action(s). The benefit may include a mitigation of the security risk.

20 Claims, 12 Drawing Sheets

(56) References Cited

U.S. PATENT DOCUMENTS

| | | | | |
|---|---|---|---|---|
| 2005/0114828 A1* | 5/2005 | Dietrich, Jr. | G06Q 10/00 | 717/101 |
| 2005/0251407 A1* | 11/2005 | Quarterman | G06Q 40/00 | 705/35 |
| 2005/0257267 A1* | 11/2005 | Williams | H04L 63/0227 | 726/25 |
| 2006/0010485 A1* | 1/2006 | Gorman | G06F 21/57 | 726/3 |
| 2006/0041857 A1* | 2/2006 | Huang | G06F 11/3616 | 717/104 |
| 2006/0080656 A1* | 4/2006 | Cain | G06F 8/65 | 717/174 |
| 2006/0277606 A1* | 12/2006 | Yunus | G06F 21/51 | 726/25 |
| 2007/0016432 A1* | 1/2007 | Piggott | G06Q 10/06 | 705/7.37 |
| 2007/0143824 A1* | 6/2007 | Shahbazi | H04L 63/083 | 726/1 |
| 2007/0143851 A1* | 6/2007 | Nicodemus | G06F 11/3495 | 726/25 |
| 2008/0263547 A1* | 10/2008 | Saunier | G06Q 10/06 | 718/100 |
| 2009/0156160 A1* | 6/2009 | Evans | G06Q 50/01 | 455/404.2 |
| 2009/0192962 A1* | 7/2009 | Rigdon | G06N 5/04 | 706/46 |
| 2009/0228316 A1* | 9/2009 | Foley | G06Q 10/06 | 705/7.28 |
| 2010/0043074 A1* | 2/2010 | Scates | G06F 21/577 | 726/25 |
| 2010/0122175 A1* | 5/2010 | Gupta | H04L 41/0893 | 715/735 |
| 2010/0275263 A1* | 10/2010 | Bennett | G06F 21/577 | 726/25 |
| 2012/0042383 A1* | 2/2012 | Greene | G06F 21/57 | 726/25 |
| 2012/0137369 A1* | 5/2012 | Shin | G06F 21/57 | 726/25 |
| 2013/0031037 A1* | 1/2013 | Brandt | H04L 63/1408 | 706/12 |
| 2013/0055399 A1* | 2/2013 | Zaitsev | H04L 63/0263 | 726/25 |
| 2013/0239167 A1* | 9/2013 | Sreenivas | H04W 12/12 | 726/1 |
| 2013/0239168 A1* | 9/2013 | Sreenivas | G06F 21/57 | 726/1 |
| 2013/0239175 A1* | 9/2013 | Sigurdson | G06F 21/35 | 726/3 |
| 2013/0239177 A1* | 9/2013 | Sigurdson | H04L 63/102 | 726/4 |
| 2013/0339204 A1* | 12/2013 | Dias De Assuncao | H04L 67/1097 | 705/35 |
| 2015/0096019 A1* | 4/2015 | Davis | H04L 63/1408 | 726/23 |
| 2016/0373478 A1* | 12/2016 | Doubleday | H04L 63/1433 | |

OTHER PUBLICATIONS

D. Verdon and G. McGraw, "Risk analysis in software design," In IEEE Security & Privacy, vol. 2, No. 4, pp. 79-84, Jul.-Aug. 2004.*

Bilge Karabacak, Ibrahim Sogukpinar, ISRAM: information security risk analysis method, Computers & Security, vol. 24, Issue 2, Mar. 2005, pp. 147-159.*

Rok Bojanc, Borka Jerman-Blažič, An economic modelling approach to information security risk management, International Journal of Information Management, vol. 28, Issue 5, Oct. 2008, pp. 413-422.*

Rebecca T. Mercuri. 2003. Analyzing security costs. Commun. ACM 46, 6 (Jun. 2003), 15-18.*

Bomil Suh and Ingoo Han. 2003. The IS risk analysis based on a business model. Inf. Manage. 41, 2 (Dec. 2003), 149-158.*

Quey-Jen Yeh, Arthur Jung-Ting Chang, Threats and countermeasures for information system security: A cross-industry study, Information & Management, vol. 44, Issue 5, Jul. 2007, pp. 480-491.*

Shawn A. Butler. 2002. Security attribute evaluation method: a cost-benefit approach. In Proceedings of the 24th International Conference on Software Engineering (ICSE '02). ACM, New York, NY, USA, 232-240.*

Stoneburner et al., Risk Management Guide for Information Technology Systems, NIST, Jul. 2002.*

\* cited by examiner

SECURITY RISK RESPONSE IMPACT ANALYSIS

BACKGROUND

Providers of online services or other computing services may deploy a large number of computing devices to execute processes and services within a computing environment. Such large deployments may enable an organization to maintain quality of service under a variety of operating conditions. However, a complex environment that includes large numbers of computing devices, services, and processes may create challenges when ensuring the security, confidentiality, and integrity of the information stored on the computing devices.

Figure 1:
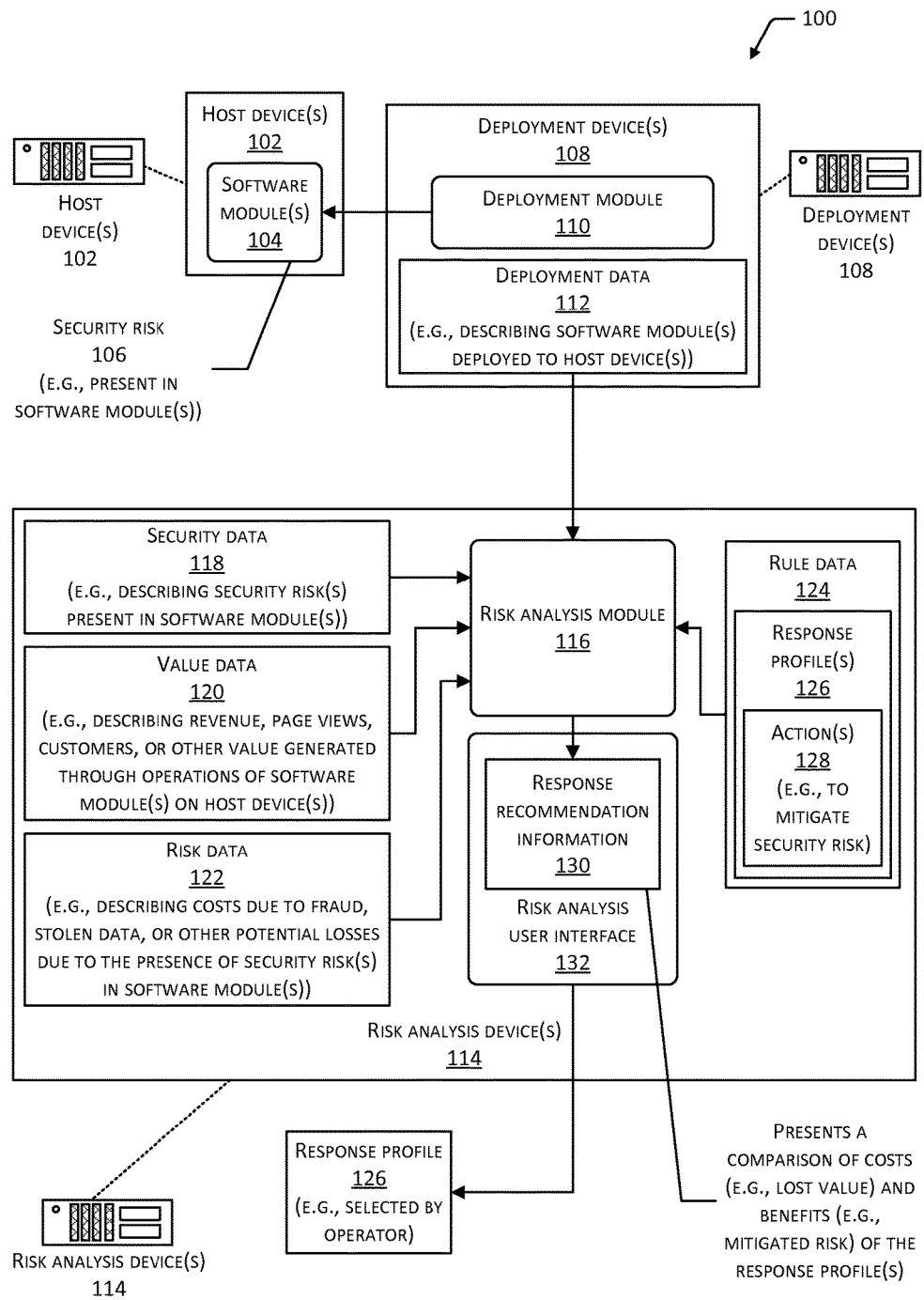
FIG. 1 depicts an environment for determining response recommendation information including one or more response profiles that each includes one or more actions for responding to a security risk, the response recommendation information further including monetary value information regarding the costs and benefits of performing the action(s).

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for determining response recommendation information for responding to a security risk that may be present in a software module. Implementations may access security data that describes the presence, or the possible presence, of a security risk in one or more software modules. Based on deployment data, a determination may be made that the potentially vulnerable or compromised software module(s) have been deployed to one or more host computing devices. Implementations may access value data that describes a positive value generated at least partly by the operation of the software module(s) on the host device(s). Such positive value may include, but is not limited to: revenue (e.g., sales or advertising revenue), an increase in the number of customers or other users of a service, a value of page views or other user interactions with the service, and so forth. Implementations may also access risk data that describes a negative value generated by the presence of the security risk in the deployed software module(s). Such negative value may include, but is not limited to, costs due to fraud, stolen data, unauthorized use of customer or user accounts, and so forth.

Based on receiving an indication of the presence or the possible presence of a security risk, implementations may access rule data describing one or more response profiles associated with the security risk. Each response profile may include one or more possible actions that may be taken in response to the security risk. In some cases, a response profile may describe one or more dependencies between multiple actions, such as a time order in which the actions are to be performed. In some cases, a response profile may include multiple actions arranged into a tree structure with branching dependencies, such that an action may be preliminary to multiple possible actions that may be performed serially or in parallel. In some cases, the response profile(s) may be described using a (e.g., formal) rules language that indicates an order in which actions may be performed or that indicates dependencies between actions.

For each of the response profile(s) associated with a security risk, implementations may employ the value data, the risk data, and the deployment data to determine costs, benefits, or costs and benefits of performing the action(s) included in the response profile. Implementations may generate response recommendation information that describes, for one or more of the possible response profiles, the costs, the benefits, or the costs and the benefits of the action(s). The response recommendation information may be presented to an operator within a user interface (UI) that enables the operator to select a response profile to be executed in response to a particular security risk. By presenting possible response profiles along with the associated cost and benefit information, implementations enable an operator to select a particular response profile to be employed in responding to a security risk. Implementations may mitigate the possible losses due to a security risk by enabling the operator to make a faster and more informed choice of a response profile compared to situations where the response recommendation information is not available.

FIG. 1 depicts an environment 100 in which implementations may operate to determine response recommendation information. As shown in FIG. 1, the environment 100 may include one or more host devices 102. The host device(s) 102 may comprise any type of computing device, including but not limited to a personal computer, a smartphone, a tablet computer, a wearable computer, an implanted computer, a mobile gaming device, an electronic book reader, an automotive computer, a desktop computer, a laptop computer, a game console, a home entertainment device, a network computer, a server computer, a mainframe computer, a distributed computing device (e.g., a cloud server), and so forth. Although examples herein may describe the host device(s) 102 as physically separate device(s), implementations are not so limited. In some cases, the host device(s) 102 may include one or more of a virtual computing environment, a hypervisor, a device emulation, or a virtual machine executing on one or more physical computing devices. The host device(s) 102 are described further with reference to FIG. 7.

Each of the host device(s) 102 may include any number of software modules 104 that have been deployed to the host device(s) 102, or that are otherwise present on the host device(s) 102. The software module(s) 104 may include any type of executable software, such as executable files, libraries, scripts, batch files, and so forth. The software module(s) 104 may also include information that is not executable, such as data files, databases, data storage structures, resource files, media files (e.g., images, audio files, or video files), and so forth. The software module(s) 104 may be in any format, such as a binary format that is machine readable during execution. The software module(s) 104 may also be in an intermediate language format that is readable by a virtual machine or runtime process during execution of the software module(s) 104. In cases where the software module(s) 104 are executable, the software module(s) 104 may be described using any type of programming language that is compiled or interpreted. The software module(s) 104 may be configured to provide any type of function or service. In some cases, the software module(s) 104 may be part of a system that provides a service to one or more end users. For example, the software module(s) 104 may provide an online store or electronic commerce service to customers. The software module(s) 104 may also provide other types of online services such as social networking service, communications services, online search services, and so forth.

In some cases, the software module(s) 104 may include components of a web page, web application, or web service. In such cases, the software module(s) 104 may be described using a programming language such as any version of Hypertext Markup Language (HTML), Dynamic HTML (DHTML), Extensible Markup Language (XML), Extensible HTML (XHTML) and so forth. The software module(s) 104 may also be described using a programming language to provide dynamic content within one or more web page(s), such as any version of JavaScript™, VBScript™, Perl™, Common Gateway Interface (CGI), Cascading Style Sheets (CSS), other types of style sheets, and so forth. The software module(s) 104 may also be written using any compiled or interpreted programming language, including but not limited to Java™, Objective-C™, C++, C, and so forth. The software module(s) 104 may be configured to provide a UI to end users (e.g., front end software modules), or may be configured to receive, process, and generate data without directly interacting with end users (e.g., back end, middleware, processing layer, or persistence layer software modules).

In some cases, a determination may be made that one or more of the software module(s) 104 may include a security risk 106. In some cases, the security risk 106 may be a vulnerability that enables an unauthorized use of the software module 104, or that enables an unauthorized use of other information on the host device(s) 102. An unauthorized use of the software module(s) 104 or the host device(s) 102 may include an unauthorized access to the software module(s) 104 or the host device(s) 102 for any purpose. For example, a software module 104 may include a security vulnerability that enables a malicious user or process to hijack or otherwise employ the software module 104 to access sensitive or confidential information stored on the host device(s) 102 or elsewhere. The software module 104 may also include a security vulnerability that enables a malicious user or process to compromise other software module(s) 104 on the host device(s) 102 in a propagating attack such as a computer virus or a computer worm. In some cases, the security risk 106 may be an attack or compromise that has already occurred or that is in progress. Alternatively, the security risk 106 may be a vulnerability that may enable a future attack or compromise of the software module 104.

In some implementations, the environment 100 may include one or more deployment devices 108 that manage the deployment of the software module(s) 104 to the host device(s) 102. The deployment device(s) 108 may include any type of computing device, including but not limited to any of the types of computing devices listed with reference to the host device(s) 102. In some cases, two or more of the deployment devices 108 may comprise a cluster, cloud, farm, or other grouping of multiple devices that coordinate operations to provide load balancing, failover support, parallel processing capabilities, shared storage resources, or other aspects. Although examples herein may describe the deployment device(s) 108 as physically separate devices, implementations are not so limited. In some cases, the deployment device(s) 108 may include one or more of a virtual computing environment, a hypervisor, a device emulation, or a virtual machine executing on one or more physical computing devices. The deployment device(s) 108 are described further with reference to FIG. 8.

The deployment device(s) 108 may execute a deployment module 110 configured to deploy the software module(s) 104 to the host device(s) 102. The deployment device(s) 108 may store deployment data 112 that describes which software module(s) 104 have been deployed to one or more host device(s) 102. The deployment data 112 may also describe a version number of the deployed software module(s) 104, such as a build number or a timestamp (e.g., date, time, or date and time) when the software module(s) 104 were deployed, built, or otherwise created. In some cases, the deployment device(s) 108 may also be configured to provide other functionality within a software development or deployment environment, such as build functionality, test functionality, or source control functionality for tracking source code files or other information.

The deployment of the software module(s) 104 to the host device(s) 102 may include, but is not limited to, one or more of the following: copying the software module(s) 104 to location(s) in memory on the host device(s) 102; deleting or modifying previous version(s) of the software module(s) 104 or other information; creating or modifying registry data on the host device(s) 102; writing other information into memory on the host device(s) 102; executing the software module(s) 104; or scheduling the execution of the software module(s) 104. The deployment of the software module(s) 104 may also include updating the deployment data 112 to indicate the deployment. In some cases, the deployment of the software module(s) 104 may include launching one or more processes that copy, install, or otherwise place the software module(s) 104 on the host device(s) 102.

As shown in the example of FIG. 1, the environment 100 may also include one or more risk analysis devices 114. The risk analysis device(s) 114 may include any type of computing device, including but not limited to any of the types of computing devices listed with reference to the host device(s) 102 and the deployment device(s) 108. In some cases, two or more of the risk analysis devices 114 may comprise a cluster, cloud, farm, or other grouping of multiple devices that coordinate operations to provide load balancing, failover support, parallel processing capabilities, shared storage resources, or other aspects. Although examples herein may describe the risk analysis device(s) 114 as physically separate devices, implementations are not so limited. In some cases, the risk analysis device(s) 114 may include one or more of a virtual computing environment, a hypervisor, a device emulation, or a virtual machine executing on one or more physical computing devices. The risk analysis device(s) 114 are described further with reference to FIG. 9.

The risk analysis device(s) 114 may execute a risk analysis module 116. The risk analysis module 116 may access security data 118 describing one or more security risks 106 present in one or more software modules 104. In some cases, the security data 118 may be generated by developers, testers, product managers, or other parties associated with the development, testing, design, or operations of the software module(s) 104. Alternatively, the security data 118 may be received from outside parties that have detected weaknesses, vulnerabilities, or other flaws in the software module(s) 104 or in a component of the software module(s) 104.

Figure 2:
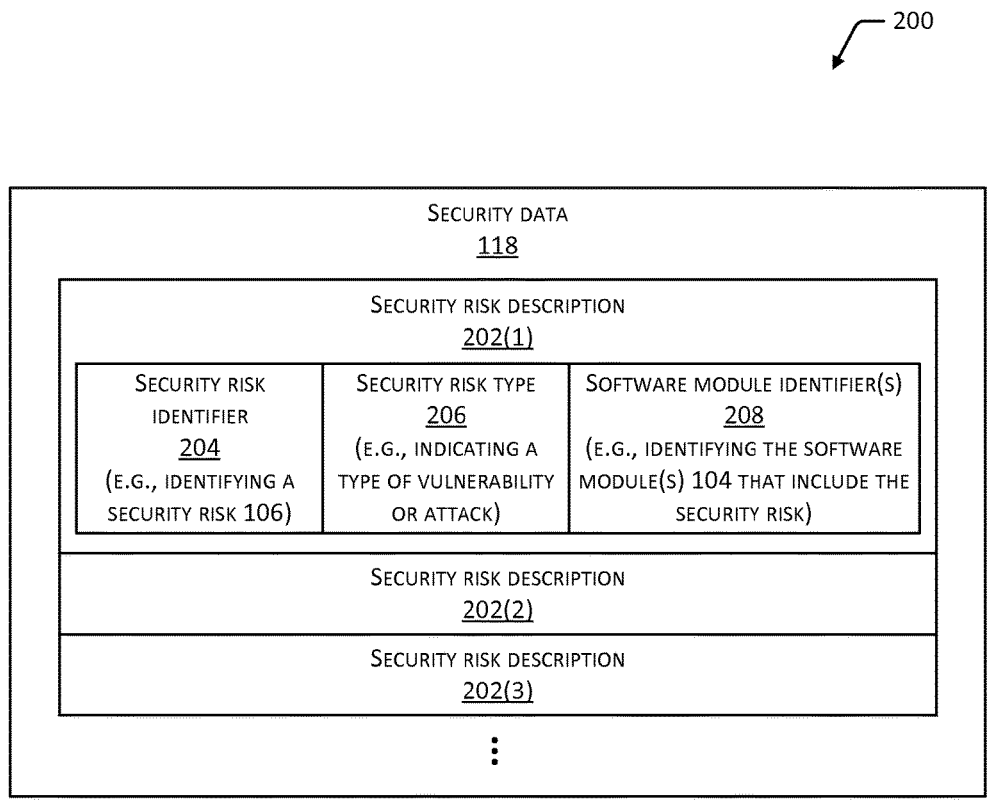
FIG. 2 depicts an example of security data including a description of one or more security risks that may be present in one or more software modules.

FIG. 2 depicts an example 200 of the security data 118. As shown in the example 200, the security data 118 may include any number of security risk descriptions 202. Each of the security risk descriptions 202 may include a security risk identifier (ID) 204 identifying a particular security risk 106. In some cases, the security risk ID 204 may be a unique name or other identification of the security risk 106. The security risk description 202 may also include a security risk type 206 of the security risk 106, indicating a type of vulnerability or attack associated with the security risk 106. The security risk type 206 may indicate whether the security risk 106 affects one or more of the confidentiality, integrity, or availability of data accessible by software module(s) 104. The security risk type 206 may also include a security grading such as that provided by the Common Vulnerability Scoring System (CVSS).

In some implementations, the security risk description 202 may also include one or more software module IDs 208 identifying the software module(s) 104 that may include the security risk 106. Such software module ID(s) 208 may include module names, version numbers, timestamps, build numbers, or other information to identify the potentially compromised software module(s) 104. The security data 118 may be arranged as a table or other data structure in which each security risk description 202 comprises a row or record of the security data 118. In such cases, the security data 118 may be searchable using the security risk ID 204 or software module ID(s) 208 as a key. In some cases, the security data 118 may be described using a markup language such as a version of XML.

With reference to FIG. 1, based on receiving an indication of a security risk 106 the risk analysis module 116 may access the security data 118 to determine which of the software module(s) 104 (if any) may include the security risk 106. Such a determination may be based on the software module ID(s) 208 listed for the security risk ID 204 corresponding to the security risk 106. The risk analysis module 116 may also access the deployment data 112 to determine which of the host device(s) 102 (if any) include the potentially compromised software module(s) 104, e.g., those software module(s) 104 that include the security risk 106.

The risk analysis module 116 may access value data 120 that describes a positive value generated at least partly by the operation of the potentially compromised software module(s) 104 on the host device(s) 102. Such positive value may include, but is not limited to: revenue (e.g., sales or advertising revenue), an increase in the number of customers or other users of a service, a value of page views or other user interactions with the service, and so forth.

Figure 3:
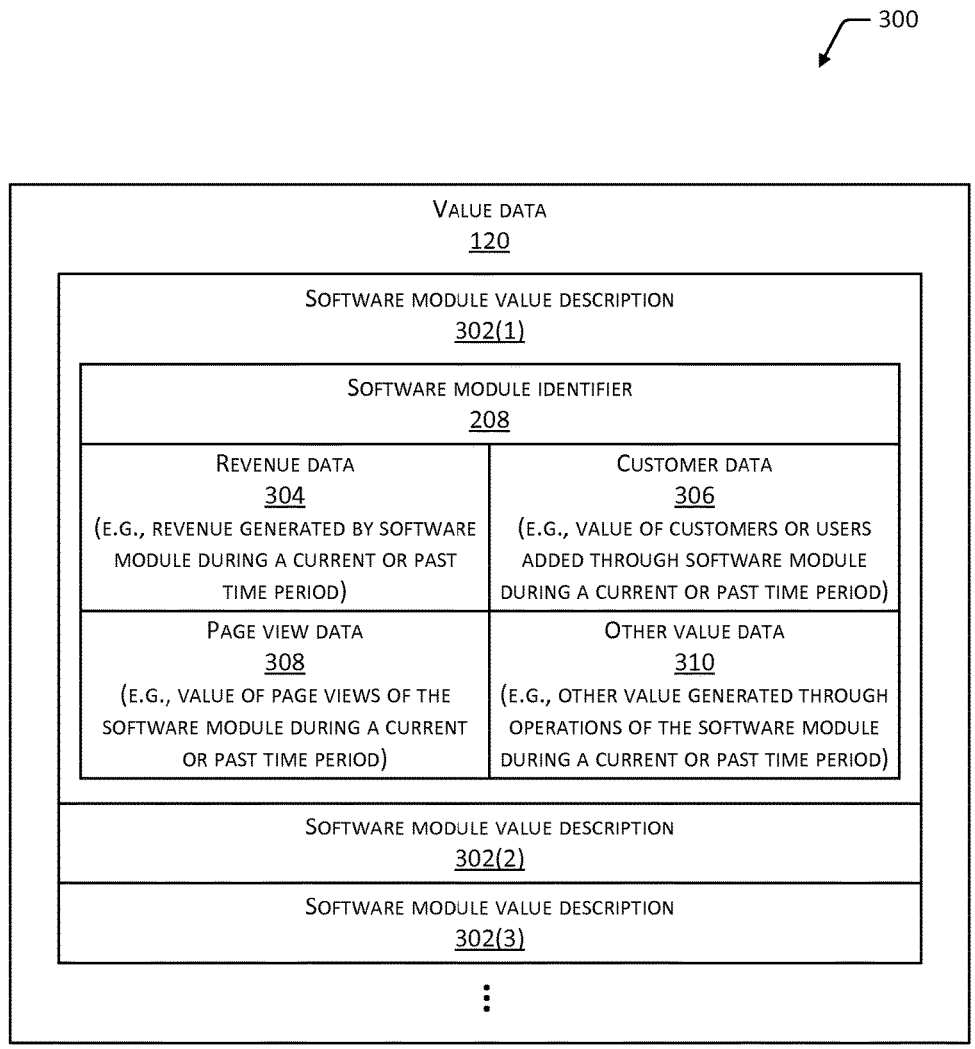
FIG. 3 depicts an example of value data including a description of various types of value that may be generated at least partly by the operations of one or more software modules.

FIG. 3 depicts an example 300 of the value data 120. As shown in the example 300, the value data 120 may include any number of software module value descriptions 302. Each of the software module value descriptions 302 may include the software module ID 208 identifying a particular software module 104. The software module value description 302 may also include revenue data 304 describing the revenue generated by the operations of the software module 104 during a current time period that includes a current time during which the risk analysis module 116 is operating to analyze the security risk 106. The revenue data 304 may also describe the revenue generated by the operations of the software module 104 during a past time period prior to a current time.

The software module value description 302 may include customer data 306 that describes the value generated by customers or other users that may be added to an online business or other online service through operations of the software module 104. The customer data 306 may provide an estimate of a monetary value that may be generated through the addition of such customers or users in the future, through future sales, advertising revenue, and so forth. The customer data 306 may reflect customers or other users added during a current time period or during a past time period. In some cases, the customer data 306 may include an estimated value of customer satisfaction or customer retention.

The software module value description 302 may also include page view data 308 that describes the value generated by customers or other users viewing pages or other UI elements generated or displayed at least in part by the software module 104. The page view data 308 may be based on advertising revenues generated through page views or clicks through advertisements presented via the software module 104. The page view data 308 may also be based on future sales or other revenues predicted to be generated based on the page views. The page view data 308 may reflect value added during a current time period or during a past time period. The software module value description 302 may also include other value data 310 describing other types of value generated through operations of the software module 104 during a current or past time period.

One or more of the revenue data 304, the customer data 306, the page view data 308, or the other value data 310 may include a description of a value (e.g., a monetary value) generated through operations of the software module 104 during a past or current time period of any length, such as the value added during a minute, hour, day, week, month, and so forth. The value may be described as historical data for a past time period. The value may also be described as current data, such as real time data that was recorded or received during a time period immediately preceding or including a current time. The value data 120 may enable the prediction of future value that may be generated through future operations of the software module 104. The value data 120 may also enable a prediction of the value that may be lost if the operations of the software module 104 were halted for a period of time to mitigate or otherwise respond to the security risk 106. The value data 120 may be arranged as a table or other data structure in which each software module value description 302 comprises a row or record of the value data 120. In such cases, the value data 120 may be searchable using the software module ID 208 as a key. In some cases, the value data 120 may be described using a markup language such as a version of XML.

In some implementations, one or more of the revenue data 304, the customer data 306, the page view data 308, or the other value data 310 may include references to streams of data that include substantially current (e.g., real-time) information regarding revenue (e.g., sales or advertising revenue), page views or other customer activity, or other data.

With reference to FIG. 1, the risk analysis module 116 may also access risk data 122. The risk data 122 may describe a negative value generated by the presence of the security risk 106 in the deployed software module(s) 104. Such negative value may include, but is not limited to, costs due to fraud, stolen data, unauthorized use of customer or user accounts, and so forth.

Figure 4:
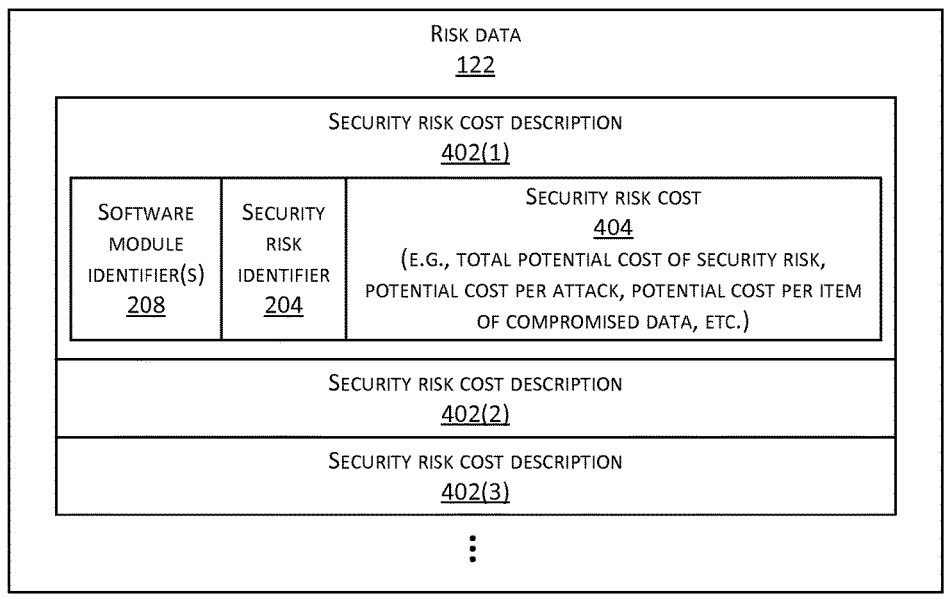
FIG. 4 depicts an example of risk data including a description of the cost (e.g., negative value) that may be generated by the presence of one or more security risks in one or more software modules.

FIG. 4 depicts an example 400 of the risk data 122. As shown in the example 400, the risk data 122 may include any number of security risk cost descriptions 402. Each of the security risk cost descriptions 402 may include one or more security module IDs 208 identifying security module(s) 104 in which a particular security risk 106 may be present. The security risk cost description 402 may also include the security risk ID 204 identifying the particular security risk 106. The security risk cost description 402 may also include a security risk cost 404. The security risk cost 404 may indicate a monetary cost associated with the presence of the security risk 106 in the software module(s) 104. In some cases, the security risk cost 404 may indicate a cost per software module 104 based on a value of the data that is accessible from the software module 104. The security risk cost 404 may be based on a type of the security risk 106. For example, the security risk cost 404 may indicate a particular cost in cases where the security risk 106 is a tampering risk that the software module(s) 104 may be tampered with (e.g., modified to include malicious code). The security risk cost 404 may indicate a different cost in other cases where the security risk 106 impacts the confidentiality, integrity, or accessibility of data accessible from the software module(s) 104.

The security risk cost 404 may describe a monetary cost of the security risk 106 as a total potential cost incurred due to the presence of the security risk 106 in the software module(s) 104 during a period of time. In some cases, the security risk cost 404 may describe the cost of the security risk 106 as a potential cost per instance of compromise (e.g., per attack) or per instance of compromised data. For example, where the security risk 106 enables the theft of data such as email addresses, credit card numbers, and so forth, the security risk cost 404 may quantify the cost of the security risk 106 per stolen email address, stolen credit card number, and so forth. The security risk cost 404 may also include a reputational cost due to the presence of the security risk 106. The reputational cost may be incurred by a business or other organization that manages or provides the software module(s) 104. In some cases, the reputational cost may include a loss of goodwill within the customer base or the general public, negative publicity, and so forth. The risk data 122 may be arranged as a table or other data structure in which each security risk cost description 402 comprises a row or record of the risk data 122. In such cases, the risk data 122 may be searchable using the security risk ID 204 as a key. In some cases, the risk data 122 may be described using a markup language such as a version of XML.

In some implementations, the description of the security risks 106 in the security data 118, the quantification of the cost of the security risks 106 in the risk data 122, or both the security data 118 and the risk data 122 may be based at least partly on one or more standards. Such standard(s) may include, but are not limited to, the standards provided by the Common Weakness Enumeration (CWE) project, the Common Vulnerabilities and Exposure (CVE) system, or the CVSS.

Figure 5:
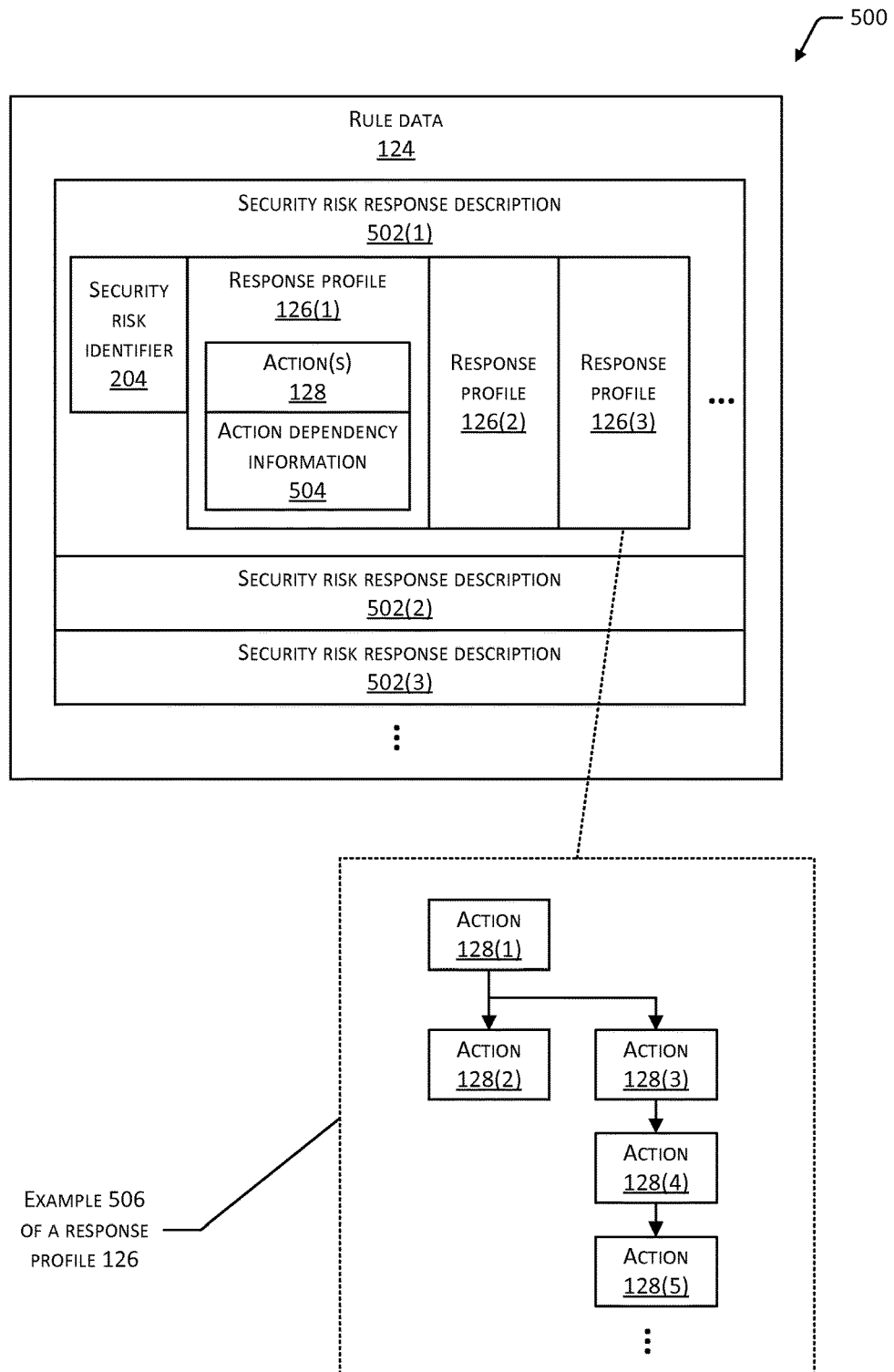
FIG. 5 depicts an example of rule data describing one or more response profiles associated with one or more security risks, each response profile including one or more actions that may be taken in response to a security risk.

With reference to FIG. 1, in some implementations the risk analysis module 116 may access rule data 124 describing one or more response profiles 126 associated with the security risk 106. FIG. 5 depicts an example 500 of the rule data 124. As shown in the example 500, the rule data 124 may include any number of security risk response descriptions 502. Each security risk response description 502 may include the security risk ID 204 identifying a particular security risk 106. The security risk response description 502 may also include any number of response profiles 126. Each response profile 126 may include any number of actions 128 that may be taken to respond to the security risk 106. Accordingly, each response profile 126 may indicate a strategy or plan that may be employed to respond to the security risk 106.

In some cases, a response profile 126 may include action dependency information 504 that describes one or more dependencies between multiple actions 128, such as a time order in which the actions 128 are to be performed. In some cases, the action dependency information 504 may indicate that multiple actions 128 have branching dependencies, such that an action 128 may be preliminary to multiple other possible actions 128 that may be performed serially or in parallel. In some cases, the response profile(s) 126 may be described using a formal rules language that enables a description of an order in which actions 128 may be performed. The rules language may also enable a description of one or more dependencies between actions 128.

Example 506 depicts an example of a response profile 126 that includes multiple actions 128 with various dependencies. In the example 506, an action 128(1) is a dependency of actions 128(2) and 128(3), such that the action 128(1) is to be started or completed prior to starting the actions 128(2) and 128(3). In some cases, the response profile 126 may specify that the actions 128(2) and 128(3) are both to be performed dependent on the action 128(1). Alternatively, the response profile 126 may specify that an operator may choose to perform one or both of the actions 128(2) and 128(3). In the example 506, the action 128(3) may spawn additional (e.g., subsequently performed) actions 128(4) and 128(5).

The possible actions 128 that may be performed in response to a security risk 106 may include, but are not limited to, one or more of the following:

Terminating operations of the host device(s) 102 to which the software module 104 is deployed, e.g., by shutting down the host device(s) 102;

Rebooting the host device(s) 102 to which the software module 104 is deployed, including shutting down and restarting the host device(s) 102;

Disabling the network communications involving the host device(s) 102 to which the software module 104 is deployed, e.g., to substantially quarantine or isolate the host device(s) 102 from other devices;

Modifying the network communications involving the host device(s) 102 to which the software module 104 is deployed, e.g., by monitoring activity on network ports, modifying the behavior of a firewall, gateway, router, or other network management device or service, and so forth. Modifying the network communications may include filtering request or response data (e.g., for HTTP requests and responses), inspecting received content or content to be sent, analyzing response traffic to identify potentially malicious automated processes (e.g., robots or denial-of-service attacks), delaying responses (e.g., throttling network traffic) to hinder fraudulent activity or actions by automated processes, and so forth;

Terminating the execution of the software module 104 on the host device(s) 102, or altering the execution of the software module 104 such that it executes within an isolated (e.g., network inaccessible) portion of the memory of the host device(s) 102;

Modifying data that is accessible by the software module 104 on the host device(s) 102 or other devices, by encrypting the data, obfuscating the data, adding additional (e.g., bogus) data, removing (e.g., sensitive or confidential) data, or performing other modifications;

Preventing access to data by the software module 104;

Modifying at least a portion of the software module 104, such as recoding, patching, or replacing at least a portion of the software module 104;

Modifying the execution of the software module 104, such as running the software module 104 in a debug mode to collect runtime information regarding the software module 104; or Monitoring the execution of the software module 104.

A response profile 126 may specify any number of action(s) 128 that are to be performed any number of times, serially or in parallel, for any period of time. For example, a response profile 126 may specify an action 128 to monitor the execution of the software module 104 for a period of time (e.g., one hour) prior to determining what other action(s) 128 (if any) are to be performed. The action(s) 128 may be performed serially, such that a first action 128 is complete prior to performing a second action 128. The action(s) 128 may also be performed in parallel, such that a first action 128 is performed at least partly contemporaneously with a second action 128. Implementations support action(s) 128 that are performed through manual actions of an operator. Implementations also support action(s) 128 that are performed automatically (e.g., at least partly without operator involvement) by the risk analysis module 116 or through the execution of a process spawned by the risk analysis module 116.

For each of the response profile(s) 126 associated with a security risk 106 in the rule data 124, implementations may employ the value data 120, the risk data 122, and the deployment data 112 to determine costs, benefits, or costs and benefits of performing the action(s) 128 included in the response profile 126. For example, where a response profile 126 includes an action 128 to shut down a host device 102 or disable its network communications, the risk analysis module 116 may access the value data 120 to determine costs of the action 128. Such costs may include the lost revenue, lost customers, lost page views, or other value that may be lost during the unavailability of the host device 102 given the software module(s) 104 that are currently deployed to the host device 102. Moreover, the risk analysis module 116 may access the risk data 122 to determine the benefits that may be achieved by isolating or disabling the host device 102 that includes the software module 104 with the security risk 106. Such benefits may be achieved by mitigating the costs that may otherwise be incurred through the presence of the security risk 106, such as stolen data, hijacked user accounts, fraud, and so forth. One or both of the cost information or the benefit information may be incorporated into response recommendation information 130 generated by the risk analysis module 116. In some cases, the response recommendation information 130 may be presented to an operator, or another user, in a risk analysis UI 132 executed by the risk analysis device(s) 114.

Figure 6:
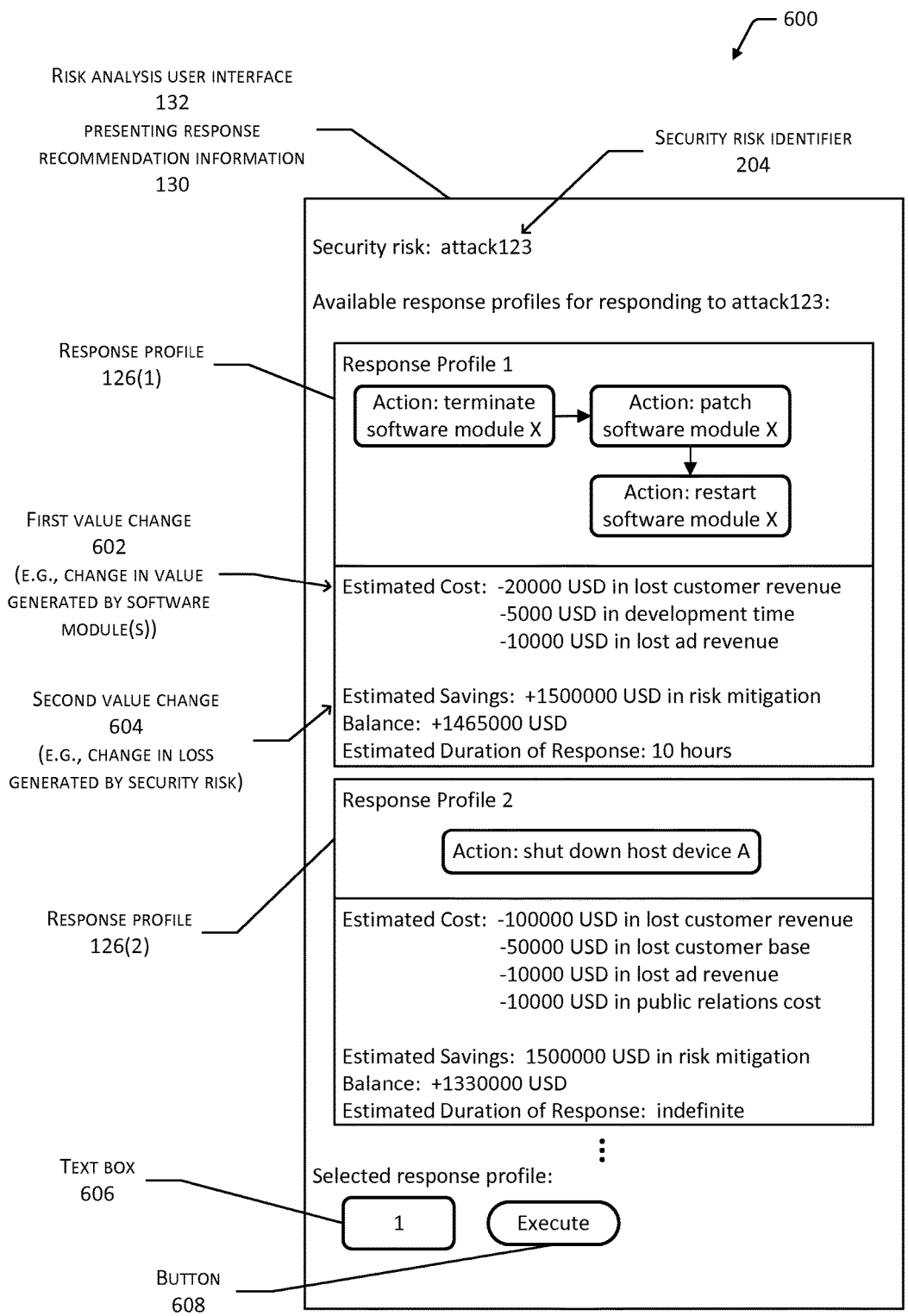
FIG. 6 depicts an example of a user interface that may be configured to present response recommendation information to an operator or another user.

FIG. 6 depicts an example 600 of the risk analysis UI 132 arranged to present the response recommendation information 130 to an operator or another user. As shown in the example 600, the presented response recommendation information 130 may include the security risk ID 204 identifying the particular security risk 106 that has been analyzed. The response recommendation information 130 may also include a description of any number of response profiles 126 that may be employed in responding to the security risk 106. For each response profile 126, the response recommendation information 130 may include a first value change 602, describing a change in the value generated by the software module(s) 104 due to the performance of the action(s) 128 included in the response profile 126. The response recommendation information 130 may also include a second value change 604, describing a change in the value (e.g., the negative value, or loss) generated by the security risk 106 due to the performance of the action(s) 128 included in the response profile 126. The first value change 602 may indicate a cost incurred by responding to the security risk 106 according to the response profile 126, such as lost sales, lost advertising revenues, lost customers, and so forth. The second value change 604 may indicate a benefit incurred by responding to the security risk 106 according to the response profile 126, such as a mitigation of the loss (e.g., data leakages, compromised systems, etc.) that may otherwise be caused by the security risk 106.

In some implementations, the response recommendation information 130 may also include an estimate of the duration of the response profile 126. The estimated duration may indicate how long the action(s) 128 may take to complete or how long before the compromised systems may be restored to a stable or secure state.

In the example of FIG. 6, the risk analysis module 116 has identified two response profiles 126(1) and 126(2) that may be employed to respond to a security risk 106 named "attack123." The response profile 126(1) includes three actions 128 to terminate a software module X, patch the software module X (e.g., modify at least a portion of its code), and restart the software module X. These three actions 128 may be at least partly dependent on one another, and the directional arrows presented in the risk analysis UI 132 may indicate a dependence of one action 128 upon another action 128. Implementations also support the use of other graphical elements to indicate dependencies.

The risk analysis module 116 has estimated, based on the value data 120, that the performance of these three actions 128 may generate a first value change 602 including the costs of 35000 U.S. dollars (USD) in lost customer revenue (e.g., lost sales), lost advertising revenue, and the cost of engineering time to write, test, and otherwise implement the patch. The risk analysis module 116 has also estimated, based on the risk data 122, that the performance of these three actions 128 may generate a second value change 604 including a savings of 1,500,000 USD in mitigating the security risk 106. For the response profile 126(1), the risk analysis module 116 calculates a positive balance (e.g., monetary value) of 1,465,000 USD that is the difference between the first value change 602 and the second value change 604. The risk analysis module 116 has estimated that the action(s) 128 included in the response profile 126(1) may have a duration of 10 hours.

The response profile 126(2) includes one action 128 to shut down a host device A where the software module X is deployed and executing. The risk analysis module 116 has estimated, based on the value data 120, that the performance of the action 128 may generate a first value change 602 including costs of 170,000 USD in lost customer revenue (e.g., lost sales), lost advertising revenue, and a lost customer base in which there is a (e.g., permanent) loss of those customers who may become so frustrated at the unavailability of the service that they go to another business. The first value change 602 also includes costs due to public relations expenditures. In some cases where a security risk 106 or the action(s) 128 taken in response to the security risk 106 are public, costs may include providing information to educate customers or the general public regarding the security risk 106 or the action(s) 128. In some cases, concessions (e.g., value) may be provided to customers who have experienced adverse effects due to the security risk 106. The risk analysis module 116 has also estimated, based on the risk data 122, that the performance of the action 128 may generate a second value change 604 including a savings of 1,500,000 USD due to mitigating the security risk 106. For the response profile 126(2), the risk analysis module 116 calculates a positive balance (e.g., monetary value) of 1,330,000 USD that is the difference between the first value change 602 and the second value change 604 for the response profile 126(2). The risk analysis module 116 has estimated that the action(s) 128 included in the response profile 126(2) may have an indefinite duration.

Accordingly, based on the estimates of the risk analysis module 116, the response profile 126(1) may provide a greater benefit than the response profile 126(2). In some implementations, as in the example of FIG. 6, the response recommendation information 130 may be sorted such that the more beneficial response profile(s) 126 are listed earlier in the response recommendation information 130. By presenting the available response profile(s) 126 for responding to a security risk 106, along with the associated cost and benefit information for each response profile 126, implementations may enable an operator to compare the various available response profiles 126 and select a particular response profile 126 that is optimal for the particular security risk 106. By providing the response recommendation information 130 in the risk analysis UI 132, implementations may enable the operator to make a faster and more informed choice of a response profile 126 compared to situations where the response recommendation information 130 is not available. Accordingly, implementations may enable the mitigation of possible losses due to a security risk 106.

In some cases, the operator may perform the action(s) 128 for the selected response profile 126 manually, or communicate to others that such action(s) 128 are to be performed. In some implementations, the risk analysis UI 132 may be configured to enable the operator to perform the action(s) 128. For example, the risk analysis UI 132 may include a text box 606 or other control that enables the operator to specify the selected response profile 126. In the example 600, the operator has opted for response profile 126(1). The risk analysis UI 132 may also include a button 608 or other control that enables the operator to send an instruction that spawns the various action(s) 128 included in the selected response profile 126. Alternatively, the response profile 126 may be selected automatically (e.g., substantially without operator intervention) by the risk analysis module 116, and the action(s) 128 included in the response profile 126 may be executed automatically. For example, in some implementations the response profile 126 may be selected and executed automatically based on the difference between the first value change 602 and the second value change 604 being optimal (e.g., minimized, maximized, or most beneficial) among the available response profiles 126 for responding to a security risk 106.

Although the example 600 depicts the risk analysis UI 132 as including particular controls and information in a particular arrangement in a UI window or view, implementations are not limited to this example. Any type of control may be employed to enable an operator to select a response profile 126 and to otherwise enter information and to issue commands to the risk analysis UI 132, including but not limited to buttons, text boxes, radio buttons, slider controls, tree views, list views, pop-up dialogs, and so forth. Implementations also support the use of audio input(s), haptic input(s), or other types of inputs to the risk analysis UI 132. The information presented through the risk analysis UI 132 may be presented according to any format or data type, including visual output, audio output, or other types of output. The controls and other information may be presented in any time sequence, in any position, or in any arrangement, and may be distributed across any number of pages, windows, views, or dialogs. Although the examples herein may describe value that is quantified in terms of a particular currency (e.g., USD), implementations are not limited to any particular measure of value. Moreover, although the example 600 depicts the risk analysis UI 132 as a graphical UI (GUI), implementations also support other types of UIs such as a command line UI (CUI).

With reference to FIG. 1, implementations enable the determination of a particular response profile 126 to be employed in responding to the security risk 106. The response profile 126 may be selected by an operator using the risk analysis UI 132. Alternatively, an optimal response profile 126 may be selected by the risk analysis module 116. In some cases, the risk analysis module 116 may employ one or more machine learning algorithms or techniques in generating the response recommendation information 130 or in selecting a response profile 126. Implementations support the use of any supervised or unsupervised machine learning algorithms or techniques, including but not limited to one or more of the following: artificial neural networks, inductive logic programming, support vector machines (SVMs), clustering, classification, Bayesian networks, decision tree learning, association rule learning, reinforcement learning, representation learning, similarity learning, metric learning, sparse dictionary learning, and so forth.

In some implementations, results of performing the action(s) 128 may be monitored, and the results may be employed to modify the response recommendation information 130 or to otherwise determine further action(s) 128 that may be performed to respond to the security risk 106. For example, in some cases the scope of a security risk 106 may not be fully known at an initial time. Accordingly, a first action 128 may be taken to disable a portion of a software module 104 that is suspected of including the security risk 106. If the results of that action 128 indicate that the security risk 106 has not been adequately mitigated, then a second action 128 may be performed to disable the entire software module 104. Further actions 128 may include quarantining the host device 102 or patching the software module 104 if the results of the second action 128 do not indicate adequate mitigation of the security risk 106. Operations of the risk analysis module 116 are described further with reference to FIGS. 10-12.

Although FIG. 1 depicts the deployment device(s) 108, the host device(s) 102, and the risk analysis device(s) 114 as separate computing devices, implementations are not so limited. In some implementations, the operations of two or more of the deployment device(s) 108, the host device(s) 102, and the risk analysis device(s) 114 may be performed on a same set of one or more computing devices.

The various devices of the environment 100 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), mobile communications networks (e.g. 3G, 4G, etc.), and so forth. In some implementations, communications between the various devices in the environment 100 may be encrypted or otherwise secured. For example, such communications may employ one or more public or private cryptographic keys, ciphers, digital certificates, or other credentials supported by a security protocol, such as any version of the Secure Sockets Layer (SSL) or the Transport Layer Security (TLS) protocol.

Figure 7:
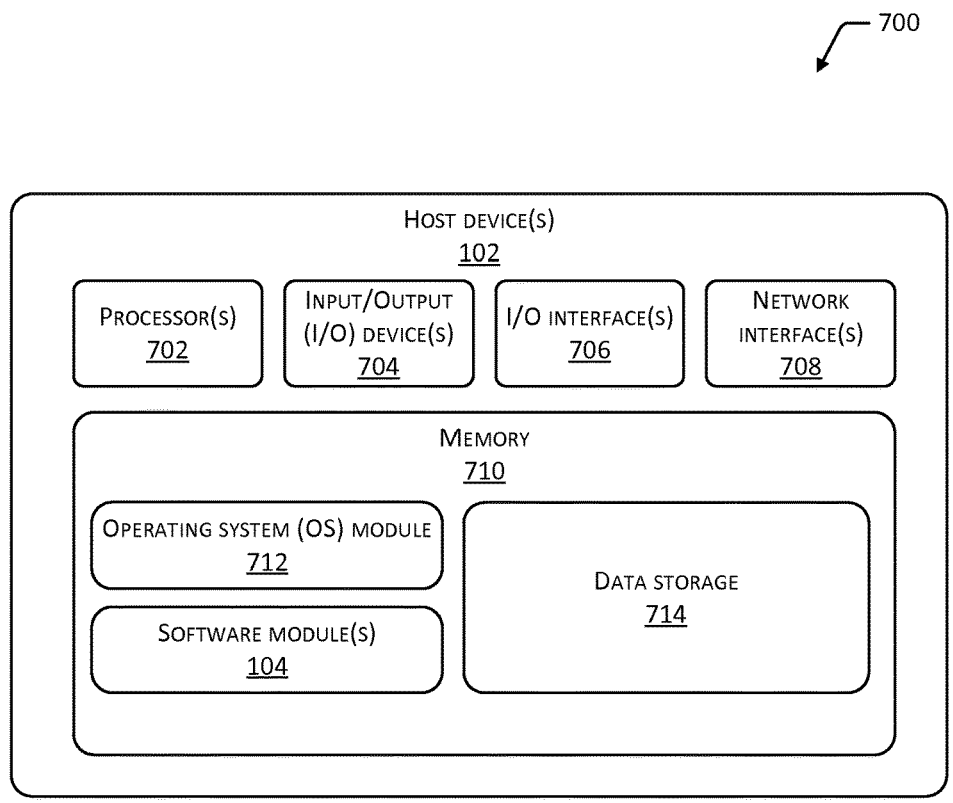
FIG. 7 depicts a block diagram of an example of the host device(s) on which one or more software modules may be deployed.

FIG. 7 depicts a block diagram 700 of an example of the host device(s) 102. As shown in the block diagram 700, the host device(s) 102 may include one or more processors 702 (e.g., hardware-based processor(s)) configured to execute one or more stored instructions. The processor(s) 702 may comprise one or more cores.

The host device(s) 102 may include one or more input/output (I/O) devices 704. The I/O device(s) 704 may include input devices such as a keyboard, a mouse, a pen, a game controller, a touch input device, an audio input device (e.g., a microphone), a gestural input device, a haptic input device, an image or video capture device (e.g., a camera), or other devices. In some cases, the I/O device(s) 704 may also include output devices such as a display, an audio output device (e.g., a speaker), a printer, a haptic output device, and so forth. The I/O device(s) 704 may be physically incorporated with the host device(s) 102 or may be externally placed.

The host device(s) 102 may include one or more I/O interfaces 706 to enable components or modules of the host device(s) 102 to control, interface with, or otherwise communicate with the I/O device(s) 704. The I/O interface(s) 706 may enable information to be transferred in or out of the host device(s) 102 or between components of the host device(s) 102, through serial communication, parallel communication, or other types of communication. For example, the I/O interface(s) 706 may comply with a version of the RS-232 standard for serial ports, or with a version of the IEEE 1284 standard for parallel ports. As another example, the I/O interface(s) 706 may be configured to provide a connection over Universal Serial Bus (USB) or Ethernet. In some cases, the I/O interface(s) 706 may be configured to provide a serial connection that is compliant with a version of the IEEE 1394 standard. The host device(s) 102 may also include one or more busses or other internal communications hardware or software that allow for the transfer of data between the various modules and components of the host device(s) 102.

The host device(s) 102 may include one or more network interfaces 708 that enable communications between the host device(s) 102 and other network accessible computing devices, such as the deployment device(s) 108 or the risk analysis device(s) 114. The network interface(s) 708 may include one or more network interface controllers (NICs) or other types of transceiver devices configured to send and receive communications over a network.

The host device(s) 102 may include one or more memories, described herein as memory 710. The memory 710 comprises one or more computer-readable storage media (CRSM). The CRSM may include one or more of an electronic storage medium, a magnetic storage medium, an optical storage medium, a quantum storage medium, a mechanical computer storage medium, and so forth. The memory 710 provides storage of computer-readable instructions that may describe data structures, program modules, processes, applications, or other data for the operation of the host device(s) 102. In some implementations, the memory 710 may provide storage of computer-readable instructions or other information in a non-transitory format.

The memory 710 may include an operating system (OS) module 712. The OS module 712 may be configured to manage hardware resources such as the I/O device(s) 704, the I/O interface(s) 706, and the network interface(s) 708, and to provide various services to applications, processes, or modules executing on the processor(s) 702. The OS module 712 may include one or more of the following: any version of the Linux™ operating system; any version of iOS™ from Apple Corp. of Cupertino, Calif., USA; any version of Windows™ or Windows Mobile™ from Microsoft Corp. of Redmond, Wash., USA; any version of Android™ from Google Corp. of Mountain View, Calif., USA and its derivatives from various sources; any version of Palm OS™ from Palm Computing, Inc. of Sunnyvale, Calif., USA and its derivatives from various sources; any version of BlackBerry OS™ from Research In Motion Ltd. of Waterloo, Ontario, Canada; any version of VxWorks™ from Wind River Systems of Alameda, Calif., USA; or other operating systems.

The memory 710 may include one or more of the modules described above as executing on the host device(s) 102, such as the software module(s) 104. The memory 710 may include data storage 714 to store data for operations of the host device(s) 102. The data storage 714 may comprise a database, array, structured list, tree, or other data structure, and may be a relational or a non-relational datastore. The data storage 714 may also store other data such as user authentication information, access control data, or other information. In some implementations, at least a portion of the information stored in the data storage 714 may be stored externally to the host device(s) 102, on other devices that may communicate with the host device(s) 102 via the I/O interface(s) 706 or via the network interface(s) 708.

Figure 8:
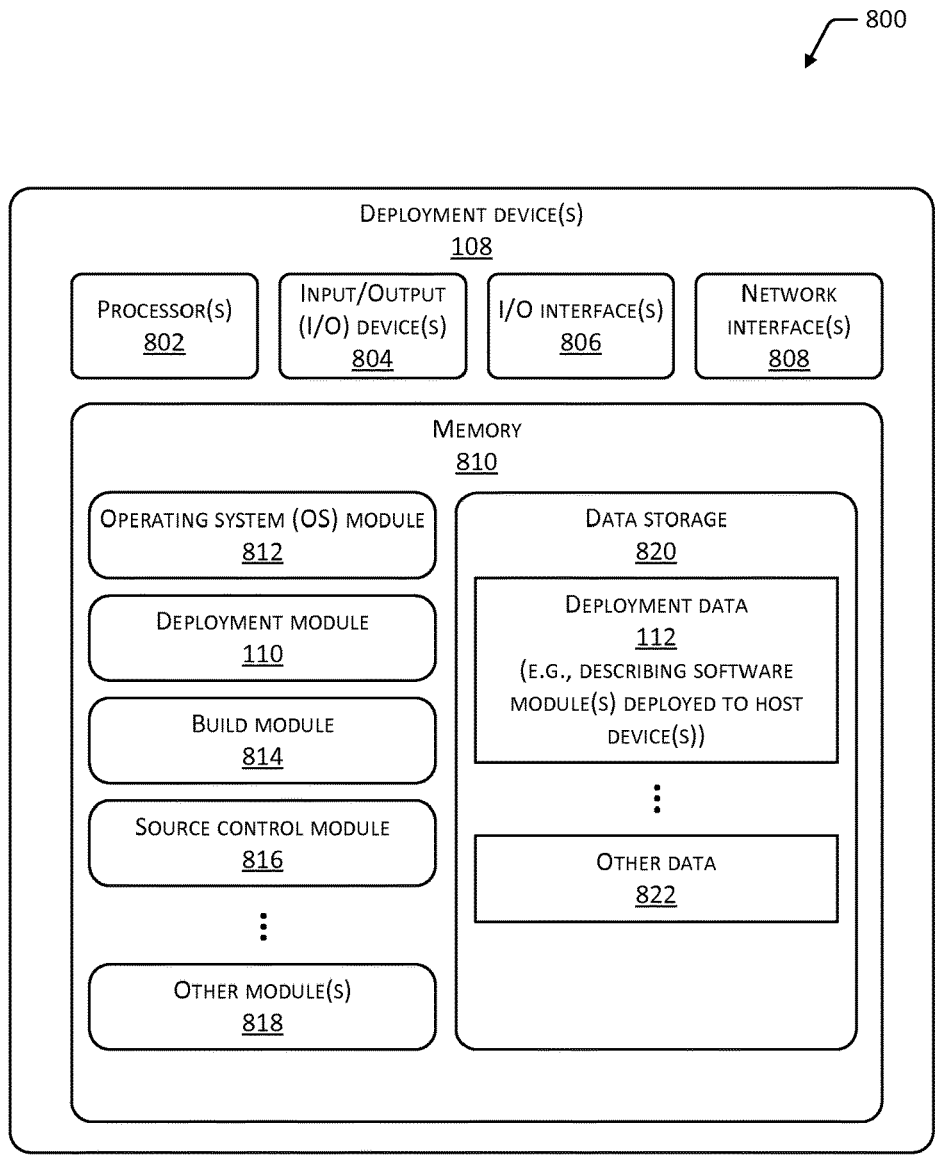
FIG. 8 depicts a block diagram of an example of the deployment device(s) that may be configured to deploy software modules(s) to host device(s), and to store deployment data describing the host device(s) to which the software module(s) have been deployed.

FIG. 8 depicts a block diagram 800 of an example of the deployment device(s) 108. As shown in the block diagram 800, the deployment device(s) 108 may include one or more processors 802 (e.g., hardware-based processor(s)) configured to execute one or more stored instructions. The processor(s) 802 may comprise one or more cores. The deployment device(s) 108 may include one or more I/O devices 804, one or more I/O interfaces 806, and one or more network interfaces 808 as described above respectively with reference to the I/O device(s) 704, the I/O interface(s) 706, and the network interface(s) 708.

The deployment device(s) 108 may include one or more memories, described herein as memory 810. The memory 810 comprises one or more CRSM, as described above with reference to the memory 710. The memory 810 may include an OS module 812 that is configured to manage hardware resources such as the I/O device(s) 804, the I/O interface(s) 806, and the network interface(s) 808, and to provide various services to applications, processes, or modules executing on the processor(s) 802. The OS module 812 may include one or more of the operating systems described above with reference to the OS module 712. The memory 810 may include one or more of the modules described above as executing on the deployment device(s) 108, such as the deployment module 110. In some cases, the memory 810 may include one or more build modules 814 that operate to compile source code, link compiled modules, execute tests (e.g., unit tests, build tests, and so forth), or perform other actions to build the software module(s) 104. The memory 810 may also include one or more source control modules 816 that store source code files or other data for the building of the software module(s) 104. The source control module(s) 816 may enable source code check-ins, check-outs, audits, comparisons, or other operations. The memory 810 may also include one or more other modules 818, such as a user authentication module or an access control module to secure access to the deployment device(s) 108, and so forth.

The memory 810 may include the data storage 820, which may store data for operations of the deployment device(s) 108. The data storage 820 may comprise a database, array, structured list, tree, or other data structure, and may be a relational or a non-relational datastore. The data storage 820 may store data such as that described above as present on the deployment device(s) 108, including the deployment data 112. The data storage 820 may also store other data 822, such as user authentication information or access control data. In some implementations, at least a portion of the information stored in the data storage 820 may be stored externally to the deployment device(s) 108, on other devices that may communicate with the deployment device(s) 108 via the I/O interface(s) 806 or via the network interface(s) 808.

Figure 9:
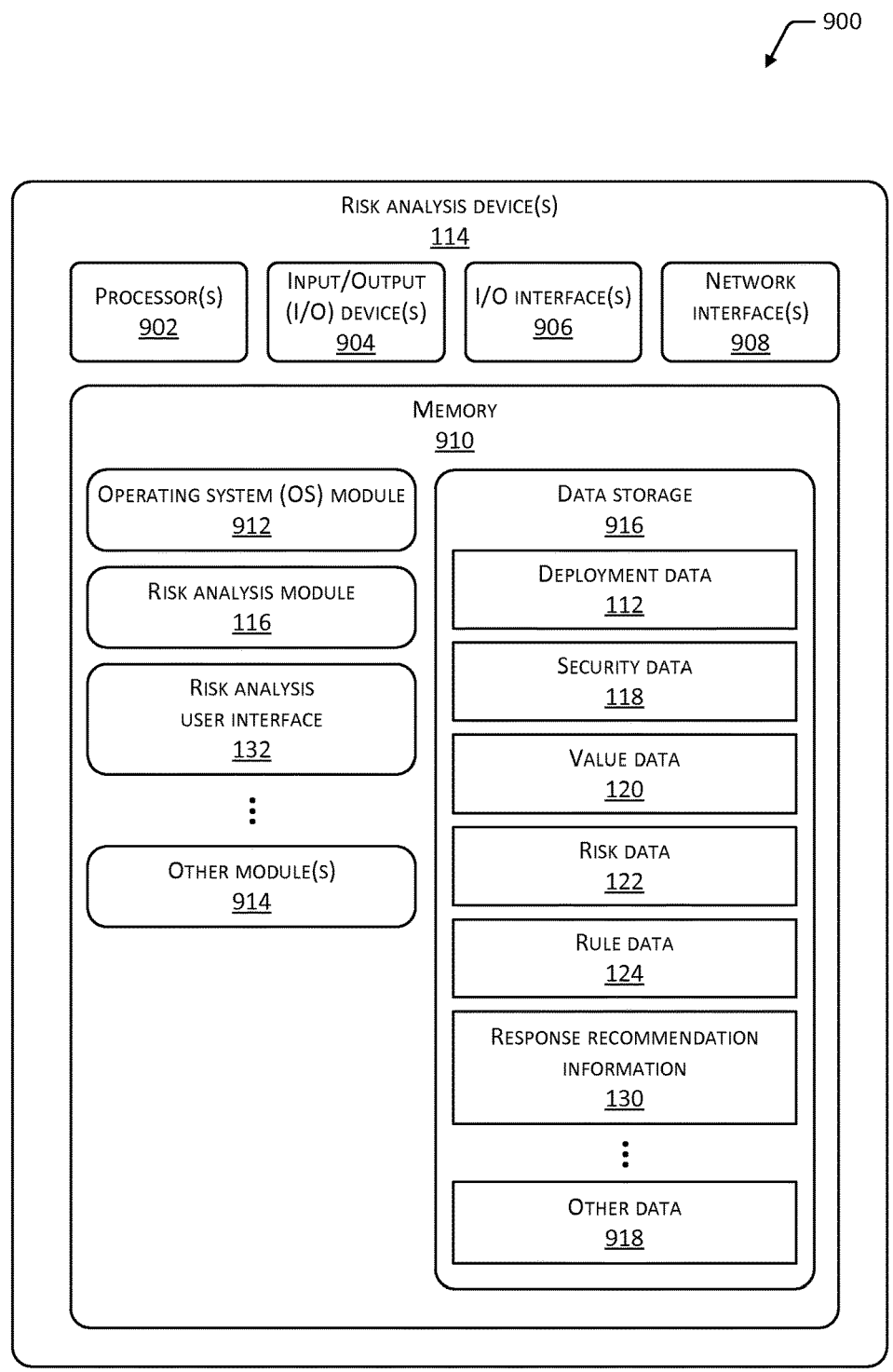
FIG. 9 depicts a block diagram of an example of the risk analysis device(s) configured to determine response recommendation information for responding to a security risk.

FIG. 9 depicts a block diagram 900 of an example of the risk analysis device(s) 114. As shown in the block diagram 900, the risk analysis device(s) 114 may include one or more processors 902 (e.g., hardware-based processor(s)) configured to execute one or more stored instructions. The processor(s) 902 may comprise one or more cores. The risk analysis device(s) 114 may include one or more I/O devices 904, one or more I/O interfaces 906, and one or more network interfaces 908 as described above respectively with reference to the I/O device(s) 704, the I/O interface(s) 706, and the network interface(s) 708.

The risk analysis device(s) 114 may include one or more memories, described herein as memory 910. The memory 910 comprises one or more CRSM, as described above with reference to the memory 710. The memory 910 may include an OS module 912 that is configured to manage hardware resources such as the I/O device(s) 904, the I/O interface(s) 906, and the network interface(s) 908, and to provide various services to applications, processes, or modules executing on the processor(s) 902. The OS module 912 may include one or more of the operating systems described above with reference to the OS module 712. The memory 910 may include one or more of the modules described above as executing on the risk analysis device(s) 114, such as the risk analysis module 116 or the risk analysis UI 132. Although the risk analysis module 116 and the risk analysis UI 132 are described herein as executing separately, in some implementations the risk analysis UI 132 may be incorporated into the risk analysis module 116 or may execute as a sub-module or sub-process of the risk analysis module 116. The memory 910 may also include one or more other modules 914, such as a user authentication module or an access control module to secure access to the risk analysis device(s) 114, and so forth.

The memory 910 may include data storage 916, which may store data for operations of the risk analysis device(s) 114. The data storage 916 may comprise a database, array, structured list, tree, or other data structure, and may be a relational or a non-relational datastore. The data storage 916 may store data such as that described above as present on the risk analysis device(s) 114, including one or more of the deployment data 112, the security data 118, the value data 120, the risk data 122, the rule data 124, or the response recommendation information 130. The data storage 916 may also store other data 918, such as user authentication information or access control data. In some implementations, at least a portion of the information stored in the data storage 916 may be stored externally to the risk analysis device(s) 114, on other devices that may communicate with the risk analysis device(s) 114 via the I/O interface(s) 906 or via the network interface(s) 908.

Figure 10:
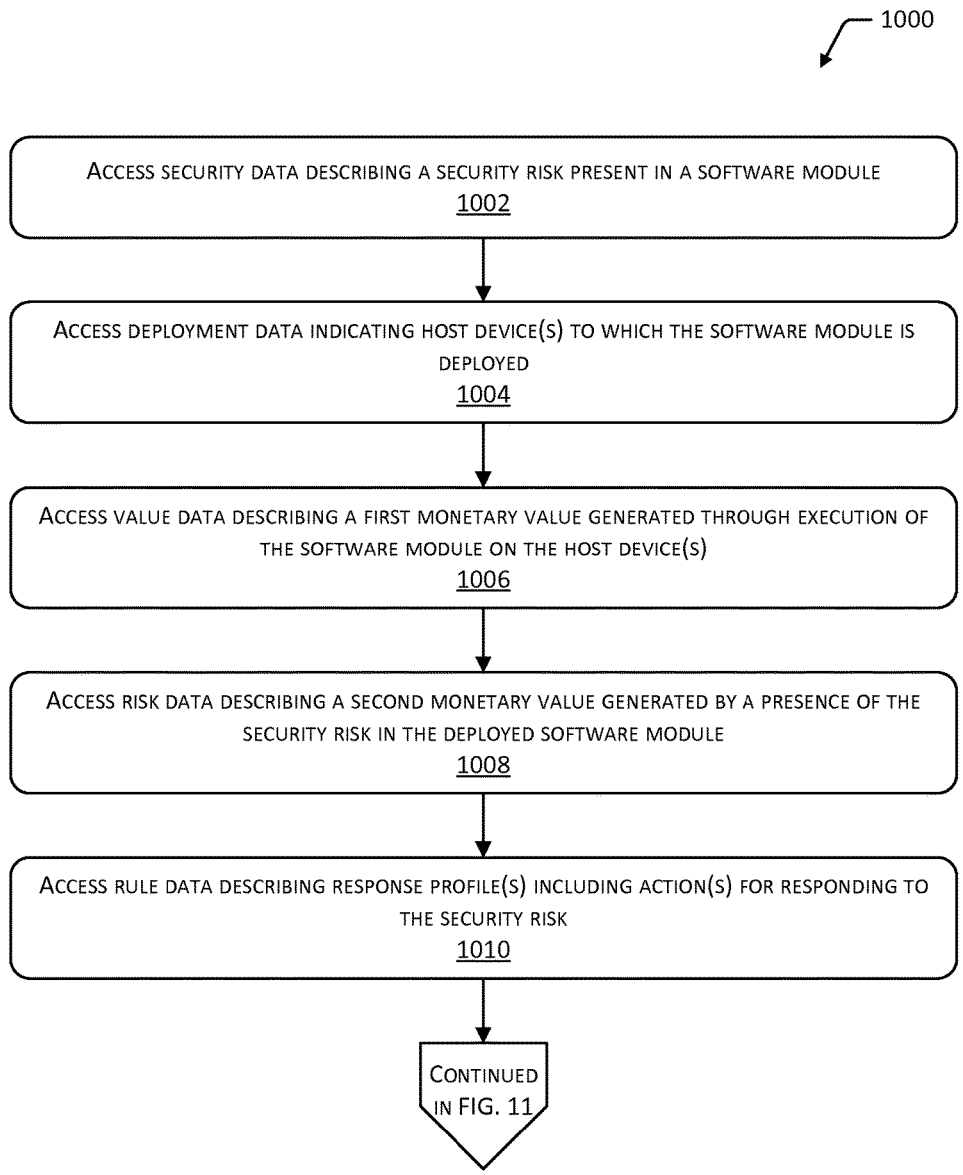
FIG. 10 depicts a flow diagram of a process for accessing various types of data to be employed in determining response recommendation information for responding to a security risk.

FIG. 10 depicts a flow diagram 1000 of a process for accessing the security data 118, the deployment data 112, the value data 120, the risk data 122, and the rule data 124 to be employed in determining the response recommendation information 130 for responding to a security risk 106. Operations of the process may be performed by the risk analysis module 116, the risk analysis UI 132, other modules executing on the risk analysis device(s) 114, or other modules executing on other devices.

At 1002, the security data 118 is accessed. The security data 118 may describe a security risk 106 present in a software module 104 that has been deployed to one or more host devices 102.

At 1004, the deployment data 112 is accessed. The deployment data 112 may indicate the host device(s) 102 to which the software module 104 has been deployed.

At 1006, the value data 120 is accessed. As described above, the value data 120 may describe, or may enable the determination of, a first monetary value (e.g., revenue) generated through the execution or presence of the software module 104 on the host device(s) 102.

At 1008, the risk data 122 is accessed. As described above, the risk data 122 may describe, or may enable the determination of, a second monetary value (e.g., cost) generated by a presence of the security risk 106 in the deployed software module 104.

At 1010, the rule data 124 is accessed. The rule data 124 may describe one or more response profiles 126 that may be employed for responding to the security risk 106. The process may then continue as described with reference to FIG. 11.

Figure 11:
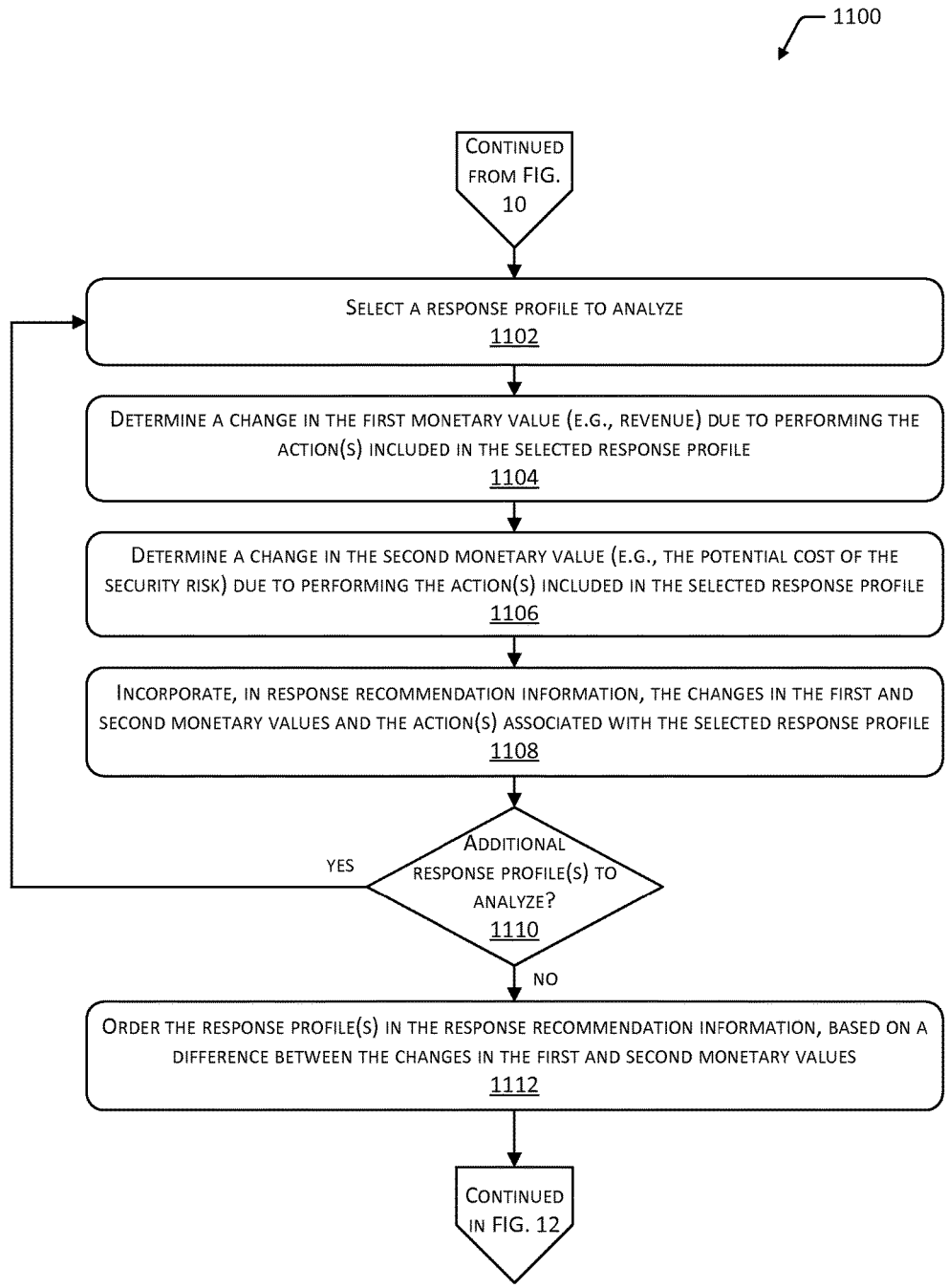
FIG. 11 depicts a flow diagram for generating response recommendation information that quantifies the costs and benefits of performing the action(s) of one or more response profiles in response to a security risk.

FIG. 11 depicts a flow diagram 1100 for generating the response recommendation information 130. Operations of the process may be performed by the risk analysis module 116, the risk analysis UI 132, other modules executing on the risk analysis device(s) 114, or other modules executing on other devices.

At 1102, a response profile 126 is selected for analysis. The response profile 126 may be one of the response profiles 126 described in the rule data 124 as available for responding to the security risk 106.

At 1104, the first value change 602 is determined. As described above, the first value change 602 may include a reduction in the value (e.g., revenue) generated by the operations of the software module 104 on the host device(s) 102. Such a reduction may be caused by the performance of the action(s) 128 included in the response profile 126 selected at 1102.

At 1106, the second value change 604 is determined. As described above, the second value change 604 may include a reduction of the cost generated by the presence of the security risk 106 in the software module 104 deployed to the host device(s) 102. The change may be caused by the performance of the action(s) 128 included in the response profile 126 selected at 1102.

At 1108, the response recommendation information 130 is generated or modified to incorporate the first value change 602 and the second value change 604.

At 1110, a determination is made whether there are additional response profile(s) 126 to be analyzed. If so, the process may return to 1102 and select another response profile 126 for analysis. If not, the process may continue to 1112.

At 1112, in some implementations the response recommendation information 130 may be sorted to order the response profile(s) 126 based on a difference between the first value change 602 and the second value change 604, e.g., to order the response profile(s) 126 based on the outcome of a cost-benefit comparison as described with reference to FIG. 6. The process may then continue as described with reference to FIG. 12.

Figure 12:
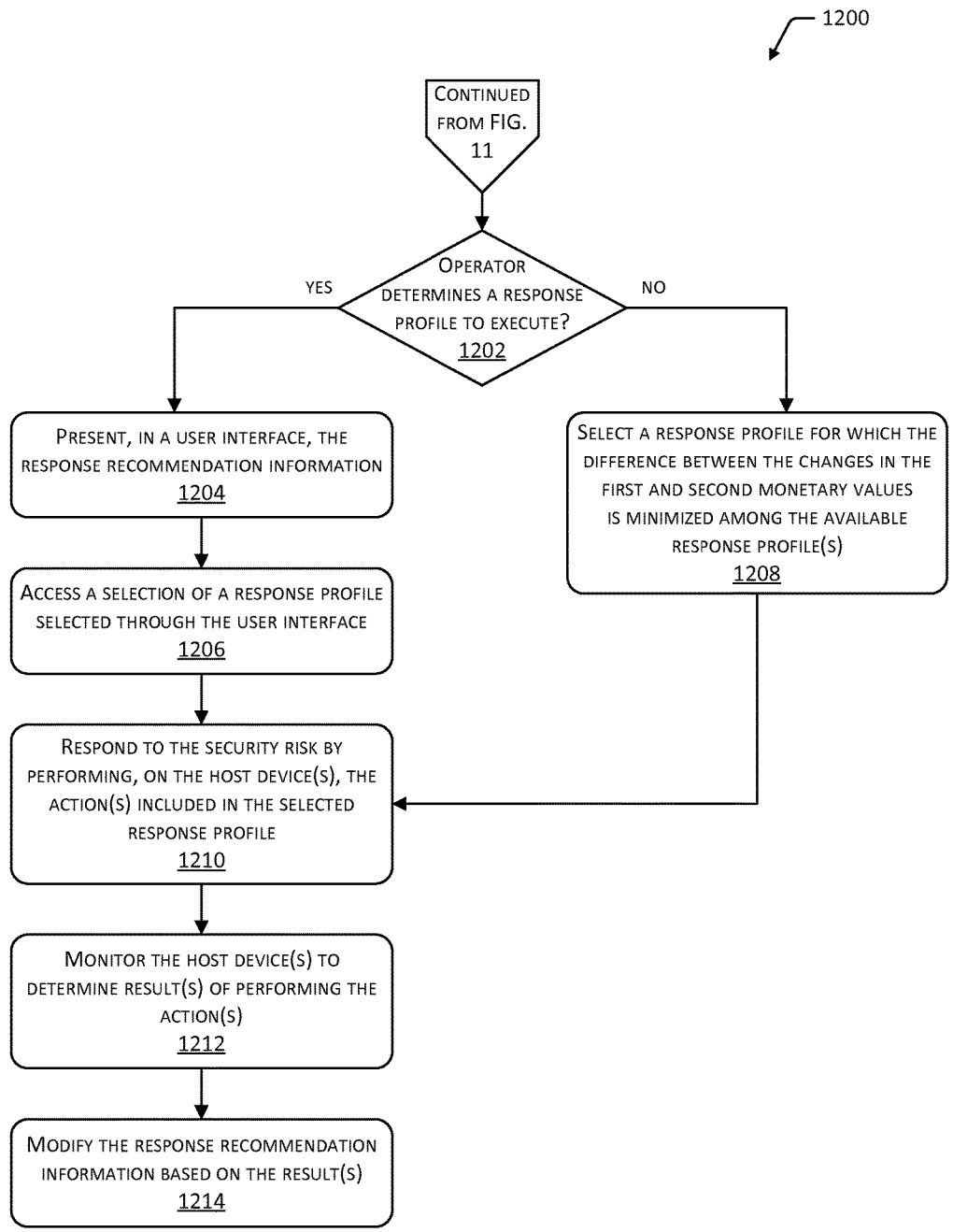
FIG. 12 depicts a flow diagram for determining, based on response recommendation information, a response profile to be executed in response to a security risk.

FIG. 12 depicts a flow diagram 1200 for determining, based on the response recommendation information 130, a response profile 126 to be employed in response to a security risk 106. Operations of the process may be performed by the risk analysis module 116, the risk analysis UI 132, other modules executing on the risk analysis device(s) 114, or other modules executing on other devices.

At 1202, a determination is made whether a response profile 126 is to be selected by an operator. If so, the process may continue to 1204. If not the process may continue to 1208.

At 1204, the response recommendation information 130 may be presented to the operator in the risk analysis UI 132, as described with reference to FIG. 6.

At 1206, a selection of a response profile 126 may be accessed, the selection made by the operator through the risk analysis UI 132. The process may then continue to 1210.

At 1208, the risk analysis module 116 may select (e.g., automatically, substantially without intervention by an operator) a response profile 126 for which the difference between the first value change 602 and the second value change 604 is minimized among the available response profiles 126. The process may then continue to 1210.

At 1210, the action(s) 128 included in the selected response profile 126 may be performed in response to the security risk 106. The action(s) 128 may be performed on the host device(s) 102 where the software module 104 is deployed, or the action(s) 128 may be performed elsewhere to alter the network communications or other performance aspects of the host device(s) 102.

At 1212, in some implementations the host device(s) 102 may be monitored to determine one or more results of performing the action(s) 128 associated with the selected response profile 126. At 1214, the response recommendation information 130 may be modified based on the result(s), as described above.

Those having ordinary skill in the art will readily recognize that certain steps or operations illustrated in the figures above may be eliminated, combined, or performed in an alternate order. Any steps or operations may be performed serially or in parallel. Moreover, the methods described above may be implemented as one or more software programs for a computer system and may be encoded in a computer-readable storage medium as instructions executable on one or more processors.

Embodiments may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, and so forth. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art. It is intended that the present disclosure encompass such changes and modifications that fall within the scope of the appended claims.

What is claimed is:

1. A computer-implemented method, comprising:
accessing security data describing a security risk present in a software module that is executable on one or more host devices, the security risk including at least one of:
an unauthorized use of the software module; or
a vulnerability that enables the unauthorized use of the software module;
accessing deployment data indicating the one or more host devices to which the software module is deployed;

accessing value data describing revenue that is at least partly generated through execution of the software module on the one or more host devices;

accessing risk data describing a loss that is at least partly generated by a presence of the security risk in the software module deployed on the one or more host devices;

accessing rule data describing response profiles associated with the security risk, individual ones of the response profiles include multiple actions arranged into a tree structure with branching dependencies to respond to the security risk;

for the individual ones of the response profiles, determining a financial impact of performing the one or more actions, the financial impact including:
a change in the revenue due to performing the one or more actions included in the response profiles; and
a change in the loss due to performing the one or more actions included in the response profiles; and causing, via a user interface, response recommendation information to be presented, wherein the response recommendation information describes, for the individual ones of the response profiles:
the one or more actions to respond to the security risk;
the change in the revenue due to performing the one or more actions; and
the change in the loss due to performing the one or more actions.

2. The method of claim 1, wherein the value data includes one or more of:
past revenue data describing past revenue generated through the execution of the software module during at least one past time period; or
current revenue data describing current revenue generated through the execution of the software module during a current time period that includes a current time.

3. The method of claim 1, further comprising:
accessing a selection of a response profile, the selection of the response profile determined through the user interface; and
performing, on the one or more host devices, the one or more actions included in the response profile.

4. The method of claim 3, further comprising:
monitoring the one or more host devices to determine results of performing the one or more actions included in the response profile; and
modifying the response recommendation information based on the results.

5. A system, comprising:
at least one computing device configured to implement one or more services, wherein the one or more services are configured to:
based on an indication of a security risk present in a software module, access deployment data indicating one or more host devices to which the software module is deployed;
access value data describing a first monetary value that is at least partly generated through execution of the software module on the one or more host devices;
access risk data describing a second monetary value that is at least partly generated by a presence of the security risk in the software module deployed on the one or more host devices;
determine response profiles including a time order in which one or more actions to respond to the security risk are to be performed;
for individual ones of the response profiles, determine:
a change in the first monetary value due to performing the one or more actions included in the response profiles; and
a change in the second monetary value due to performing the one or more actions included in the response profiles; and
cause response recommendation information to be presented, wherein the response recommendation information describes, for the individual ones of the response profiles:
the change in the first monetary value; and
the change in the second monetary value.

6. The system of claim 5, wherein the security risk includes at least one of:
an unauthorized use of the software module; or
a vulnerability that enables the unauthorized use of the software module.

7. The system of claim 5, wherein the first monetary value includes one or more of:
a revenue that is at least partly generated through the execution of the software module on the one or more host devices; or
an estimated future revenue from an estimated number of additional customers generated during the execution of the software module on the one or more host devices.

8. The system of claim 5, wherein the second monetary value includes a loss due to one or more of:
an unauthorized access to sensitive data including one or more of user information, payment information, or confidential information associated with business operations;
a fraudulent use of one or more user accounts; or
a reputational cost to an organization that provides the software module.

9. The system of claim 5, wherein:
the determining of the response profiles is based at least partly on rule data describing the response profiles associated with the security risk.

10. The system of claim 5, wherein the one or more actions include one or more of:
terminating operations of at least one of the one or more host devices to which the software module is deployed;
rebooting the at least one of the one or more host devices;
disabling network communications of the at least one of the one or more host devices;
modifying the network communications of the at least one of the one or more host devices;
terminating the execution of the software module on the at least one of the one or more host devices;
modifying data that is accessible by the software module;
preventing access to the data by the software module;
modifying at least a portion of the software module; or
monitoring the execution of the software module for a time period.

11. The system of claim 5, wherein:
the one or more services are further configured to determine, for the individual ones of the response profiles, a difference between the change in the first monetary value and the change in the second monetary value; and
the presenting of the response recommendation information includes presenting at least two of the response profiles in an order according to the difference between the change in the first monetary value and the change in the second monetary value.

12. The system of claim 5, wherein the one or more services are further configured to:

identify at least one response profile included in the response profiles described in the response recommendation information; and performing on the one or more host devices, the one or more actions included in the at least one response profile.

13. The system of claim 12, wherein the identified at least one response profile includes a response profile for which a difference between the change in the first monetary value and the change in the second monetary value is minimized among the response profiles.

14. The system of claim 12, wherein:
the response recommendation information is presented through a user interface; and
the identifying of the at least one response profile includes accessing a selection of the at least one response profile, the selection determined through the user interface.

15. One or more non-transitory computer-readable media storing instructions which, when executed by at least one processor, instruct the at least one processor to perform actions comprising:
accessing deployment data indicating one or more host devices to which a software module is deployed, the software module including a security risk;
accessing value data describing a first monetary value that is at least partly generated through execution of the software module on the one or more host devices;
accessing risk data describing a second monetary value that is at least partly generated by a presence of the security risk in the software module deployed on the one or more host devices;
determining response profiles including one or more actions in a time order to respond to the security risk;
for individual ones of the response profiles, determining:
a change in the first monetary value due to performing the one or more actions included in the response profiles; and
a change in the second monetary value due to performing the one or more actions included in the response profiles; and
causing response recommendation information to be presented, wherein the response recommendation information describes, for the individual ones of the response profiles:
the change in the first monetary value; and
the change in the second monetary value.

16. The one or more non-transitory computer-readable media of claim 15, wherein the actions further comprise:
identifying at least one response profile included in the response profiles described in the response recommendation information; and
performing, on the one or more host devices, the one or more actions included in the at least one response profile.

17. The one or more non-transitory computer-readable media of claim 16, wherein the identified at least one response profile includes a response profile for which a difference between the change in the first monetary value and the change in the second monetary value is minimized among the response profiles.

18. The one or more non-transitory computer-readable media of claim 16, wherein:
the response recommendation information is presented through a user interface; and
the identifying of the at least one response profile includes accessing a selection of the at least one response profile, the selection determined through the user interface.

19. The one or more non-transitory computer-readable media of claim 18, wherein:
the determining of the response profiles is based at least partly on rule data describing the response profiles associated with the security risk;
the rule data further describes, for the individual ones of the response profiles, an order in which to perform the one or more actions to respond to the security risk; and
the presenting of the response recommendation information through the user interface further comprises presenting, in the order, a description of the one or more actions associated with at least one of the response profiles.

20. The one or more non-transitory computer-readable media of claim 15, wherein the security risk includes at least one of:
an unauthorized use of the software module; or
a vulnerability that enables the unauthorized use of the software module.

* * * * *